(12) United States Patent
Egan (10) Patent No.: US 6,893,686 B2
(45) Date of Patent: May 17, 2005

(54) NON-FLUOROCARBON OIL AND GREASE BARRIER METHODS OF APPLICATION AND PACKAGING

(75) Inventor: Philip A. Egan, Wellford, SC (US)

(73) Assignee: Exopack, L.L.C., Spartanburg, SC (US)

( * ) Notice: Subject to any disclaimer, the term of this patent is extended or adjusted under 35 U.S.C. 154(b) by 0 days.

(21) Appl. No.: 10/200,209

(22) Filed: Jul. 22, 2002

(65) Prior Publication Data

US 2003/0170408 A1 Sep. 11, 2003

Related U.S. Application Data

(60) Provisional application No. 60/353,761, filed on Jan. 31, 2002.

(51) Int. Cl.[7] .................................................. B05D 3/06
(52) U.S. Cl. .................... 427/496; 427/504; 427/508; 427/510; 427/258; 427/391; 427/407.1; 427/411
(58) Field of Search .............................. 427/496, 504, 427/510, 511, 508, 551, 552, 553, 558, 559, 258, 385.5, 407.1, 419.1

(56) References Cited

U.S. PATENT DOCUMENTS

| | | |
|---|---|---|
| 2,164,495 A | 7/1939 | Brown |
| 2,273,560 A | 2/1942 | Calvert |
| 3,137,436 A | 6/1964 | Moors et al. |
| 3,903,335 A | 9/1975 | Jones |
| 4,097,297 A | 6/1978 | Keene |
| 4,493,127 A | 1/1985 | Blanke, Jr. et al. |
| 4,521,492 A | 6/1985 | Allen |
| 4,568,574 A | 2/1986 | Allen |
| 4,946,289 A | 8/1990 | Bolling et al. |
| 4,952,441 A | 8/1990 | Bose et al. |
| 4,994,324 A | 2/1991 | Bose et al. |
| 5,038,009 A | 8/1991 | Babbitt |
| 5,171,594 A | 12/1992 | Babbitt |
| RE34,647 E | 6/1994 | Baker et al. |
| 5,345,399 A | 9/1994 | Collins |
| 5,429,294 A | 7/1995 | Propst |
| 5,482,376 A | 1/1996 | Moseley et al. |
| 5,488,220 A | 1/1996 | Freerks et al. |
| 5,506,036 A | 4/1996 | Bergerioux |
| 5,529,396 A | 6/1996 | Pryor et al. |
| 5,560,296 A | 10/1996 | Adams |

(Continued)

FOREIGN PATENT DOCUMENTS

| | | |
|---|---|---|
| GB | 2 351 039 A | 12/2000 |
| WO | WO 00 53429 A1 | 9/2000 |
| WO | WO 01 94451 A2 | 12/2001 |

OTHER PUBLICATIONS

Chemical and Engineering News, Jan. 29, 2001, p. 17.
Environmental Science and Technology, 2001, 35, 766–770.
Environmental Science and Technology, 2001, 35, 1339–1342.
Scientific American, Mar. 2001, 18.

*Primary Examiner*—Erma Cameron
(74) *Attorney, Agent, or Firm*—Bracewell & Patterson LLP (57) ABSTRACT

A non-fluorocarbon oil and grease barrier packaging for storing materials, particularly products that need oil and grease resistant characteristics. The barrier packaging does not contain fluorocarbons, which improves the environmental rating of the oil and grease barrier packaging. The packaging is made by applying an acrylate based overprint varnish to a substrate and then curing the overprint varnish with a curable energy source, which regulates a cross-link density of the overprint varnish. Application can be flexography, rotogravure, or either rod or blade coated. The overprint varnish possesses oil and grease resistant characteristics, which allows packaging producers to forego use of oil and grease resistant coated substrates in their packaging manufacturing processes.

27 Claims, 8 Drawing Sheets

U.S. PATENT DOCUMENTS

| | | |
|---|---|---|
| 5,601,369 A | 2/1997 | Moseley et al. |
| 5,674,961 A | 10/1997 | Fitzgerald |
| 5,728,037 A | 3/1998 | Pryor et al. |
| 5,770,839 A | 6/1998 | Ruebush et al. |
| 5,773,131 A | 6/1998 | Dettling |
| 5,871,790 A | 2/1999 | Monier et al. |
| 6,007,902 A | 12/1999 | Adur et al. |
| 6,019,713 A | 2/2000 | Scypinski et al. |
| 6,046,443 A | 4/2000 | Ackerman et al. |
| 6,093,775 A | 7/2000 | Pechhold |
| 6,132,822 A | 10/2000 | Overcash et al. |
| 6,213,644 B1 | 4/2001 | Henderson et al. |
| 6,374,461 B1 | 4/2002 | Gober et al. |
| 2002/0164440 A1 | 11/2002 | Leeper et al. |

NON-FLUOROCARBON OIL AND GREASE BARRIER METHODS OF APPLICATION AND PACKAGING

RELATED APPLICATIONS

This application claims the benefit of provisional application with the U.S. Ser. No. 60/353,761, filed on Jan. 31, 2002, which hereby is incorporated by reference in its entirety.

BACKGROUND OF THE INVENTION

1. Field of the Invention

The invention relates generally to oil and grease resistant packaging. In more specific aspects, the invention relates to methods for applying oil and grease resistant overprint varnishes (OPV) to multi-wall packaging substrates and to the resulting packaging end product.

2. Description of the Prior Art

Consumer packaging is very important in today's market place. Not only do the products within the packaging have to be fresh, but the package outside must be aesthetically appealing. Traditionally, to get the best protection for the goods within packaging, the outer packaging quality was sometimes sacrificed.

Most consumer packaging is made from single ply substrates that are added together to form multi-ply or multi-walled flexible packaging. Some paper suppliers manufacture multi-wall natural kraft paper substrates, but most packaging producers make their own multi-wall constructions. Typically, fluorocarbon treated, bleached, clay coated or unbleached natural kraft paper is a secondary oil and grease barrier for such multi-wall paper packaging. For aesthetic reasons, this paper substrate must be oil and grease related stain resistant and "stain proof" from both inside and outside of the package. Stain resistant materials prevent oil and grease from bleeding through a substrate, which makes a stain resistant material a physical barrier for oil and grease. Stain proof materials do not show any oil and grease staining. The oil and grease may pass through the fiber matrix within the substrate, but stain proof materials will not show a stain. This stain proof requirement exists in manufacturing, packing, shipping and handling environments. Many times the stain proof substrate is the outer print ply of the packaging.

In addition to being stain proof, packaging typically must have some graphics printed on the exterior ply in order to identify the contents of the package and for advertising purposes. The paper substrate has to be printed with the information. To enable the graphics to remain on the substrate without smearing or fading, an overprint varnish is typically applied to the outer ply of the bag.

For years, most oil and grease resistant coatings contained chemicals known as fluorocarbons. These fluorocarbon based coatings are paper machine applied saturants. Examples of this type of coating are described in U.S. Pat. No. 5,674,961, issued to Fitzgerald and U.S. Pat. No. 4,097,297 issued to Keene. Synthetic fluorocarbons have recently come under governmental scrutiny due to their deleterious environmental effects. Fluorocarbons may be considered toxic and may be considered non-biodegradable, which arguably results in bioaccumulation within humans and other mammals. An alternative non-fluorocarbon, multi-wall substrate outer print ply is needed for the oil and grease resistant (OGR) marketplace.

Prior attempts have been made to decrease the environmental effects of fluorocarbons. More environmentally friendly alternative synthetic fluorocarbon paper treatments have been developed. Problems still exist with these alternatives, however. Many of the alternatives still contain a fluorocarbon content. Since the fluorocarbon content is so low, these alternatives may be considered less persistent in the environment, but there are still issues with toxicity to humans and other mammals. Additionally, the fluorocarbon alternatives are expensive to produce, and it is uncertain if a reliable supply source exists for the future.

One example of a more environmentally friendly overprint varnish is described in U.S. Pat. No. 4,097,297 to Keene (the '297 patent). The '297 patent describes an overprint varnish that is nitrocellulose based. The overprint varnish, however, still contains fluorocarbons in a small percentage in its composition. This overprint varnish works better when used in a solution containing a solvent. The use of a solvent, however, adds considerable costs to the manufacturing process and the solvents emit harmful volatile organic chemicals (VOC's) during application. Additionally, the method of drying the overprint varnish to substrates is inefficient and time-consuming. The drying process requires either drying with a heater, which increases capital costs, or at room temperature, which increases the time required to dry the overprint varnish.

To combat the environmental and toxicity consequences of using fluorocarbons, non-fluorocarbon alternatives have been developed. Such developments include synthetic latexes, a combination of natural cellulosic gums, starch, and/or proteins, and heavy paper refining. While these alternatives are certainly more environmentally friendly and less toxic than fluorocarbons, there are still problems using these alternatives. The use of synthetic latexes or the combination of natural cellulosic gums, starch, and/or proteins requires very high coat weights when applying them to the paper substrates. The high coat weights result in poor paper machinery operation and increase the amount of maintenance required on these machines. Each of the alternatives are very costly, which makes them economically infeasible. Additionally, none of the three alternatives provide very good oil and grease resistance.

Problems also exist related to processes for applying overprint varnishes to substrates. U.S. Pat. No. 6,132,822 to Overcash, et al. (the '822 patent), for example, discloses a method of applying an overprint varnish that is environmentally friendly and has good oil barrier characteristics. The application process disclosed in the '822 patent, however, requires a high coat weight and that the high gloss coating to be rod applied. These limitations make this process very expensive and inefficient since it is difficult for the paper machines to handle, as previously discussed. Additionally, the process is limited since other application methods, such as flexography, cannot be used.

As another alternative to fluorocarbon components, plastic and polymer alternative packaging constructions have been developed. Problems also still exist with these alternatives, however. The plastic and polymer packaging materials have very high raw material costs associated with them. These alternatives also operate less efficient on the converting and packing machinery. Additional equipment is also necessary when using these alternatives. This increases the capital assets that are required, which many times makes use of these alternatives economically unfeasible.

Most packaging producers purchase paper substrates to make their packaging that are pretreated with oil and grease resistant materials, such as those described above. The prior art oil/grease resistant coatings are applied to the substrates prior to construction of the packaging. Once they receive the oil and grease resistant treated substrates, they then apply their graphics to the substrates, apply an overprint varnish over the graphics, and then form their end packaging products. This increases the raw material costs in manufacturing their products since oil and grease resistant coatings increase the cost of the paper substrates.

With more and more products being packaged for consumer convenience, a need exists for packaging that is environmentally friendly, and provides superior barrier properties to oil and grease. With increased market competition, the packaging preferably needs to be able to be decorated aesthetically and possess enough strength to withstand the elements to which the packaging will be exposed. A further need exists for a method of applying an overprint varnish to paper substrates that is more cost effective, efficient, and easier to run on the existing paper processing machinery. Since an overprint varnish is applied typically to substrates before forming end product packaging, another need exists for simplifying this process by including the oil and grease resistant properties in the overprint varnish and eliminating the need to purchase oil and grease resistant substrates.

SUMMARY OF THE INVENTION

In view of the foregoing, the present invention advantageously provides end product packaging that contains an overprint varnish applied to at least one side of at least one substrate layer that forms the end product packaging. The overprint varnish of the present invention preferably has an acrylate based, oil and grease resistant composition. The overprint varnish can be applied to any or all substrate layers of a multi-ply substrate, on one or both sides of any or all of the substrate layers. The present invention advantageously provides a method for applying and curing the overprint varnish to the substrate layers of the packaging that substantially increases the oil and grease resistance of the packaging. The present invention also advantageously provides a method for forming a product package using a substrate with the overprint varnish applied to it according to the present invention. The products with the overprint varnish applied in accordance with the methods described herein are stain resistant, giving them a physical barrier to oil and grease products.

The substrate that is used to produce product packaging can contain one or more multiple layers, or plies. The packaging can be formed by adding several single ply substrates together or a ready-made multi-ply substrate can be used. The overprint varnish can be applied to any and all plies of a substrate. The overprint varnish can also be applied to one or both sides of each ply. Substrates with the overprint varnish applied to them, or one or both sides, can be used for any ply within a multi-ply bag construction. For example, a three-ply bag can be constructed with the overprint varnish applied to both the inner and outer surfaces of any, or all, of the plies.

A packaging bag constructed in accordance with the present invention possesses many desirable qualities for packaging products. It is more environmentally friendly since the overprint varnish is acrylate based, as opposed to the fluorocarbon based paper coatings used in the prior art. It possesses great oil and grease resistance. It is also aesthetically pleasing since the varnish protects paints and graphics on the substrate very well.

An inventive packaging bag may be constructed in a variety of forms, depending upon the product to be placed within the bag. A packaging bag can, for example, be a sewn open mouth bag, a pasted valve bag, a pinch bottom bag, pasted open mouth bag, or automatic bag. The forms of such bags will be known to one skilled in the art. Both bags and sacks can be created using the methods of this invention. The primary difference between the two terms is that sacks are generally stronger than bags, but the shapes are generally the same. The terms may be used interchangeably herein since the strength of the bag chosen will depend upon what product is being packaged within it.

The present invention advantageously provides a method of curing an overprint varnish applied to a substrate so that the substrate having the cured overprint varnish applied thereto is oil and grease resistant. The method preferably includes supplying a substrate and applying the overprint varnish to the substrate. The substrate is then cured, which regulates a cross-link density of the overprint varnish, so that the overprint varnish provides increased oil and grease resistant properties. Radiation curing by ultraviolet light or electron beam is the preferred curing method.

The described methods of applying the overprint varnish to the bag are very efficient. The overprint varnish preferably is cured only until a proper coat weight is achieved, which preferably is reached when the coat weight is between about 1.2 lb/3000 ft$^2$ and about 1.5 lb/3000 ft$^2$ for a clay coated substrate and is between about 1.2 lb/3000 ft$^2$ and about 2.2 lb/3000 ft$^2$ for a non-clay coated substrate. In an embodiment of the invention, radiation curing is used for curing the overprint varnish. The overprint varnish can be applied to both the inner and outer surfaces of the substrate. Unlike prior art methods for applying an oil and grease resistant coating, the oil and grease resistant coating is not applied during the paper manufacturing process when the fibers of the plies are wet and is not absorbed by the fibers using saturation technology.

It is envisioned that the packaging end products with this overprint varnish applied to them can be used for any type of product that requires oil and grease resistant characteristics. Such uses include candy wrappers, food items, dog food bags, charcoal bags, and other uses that have an oil and grease resistant requirement. Other uses will be known to one skilled in the art and are to be considered as within the scope of this invention.

The packaging product and method of the present invention as well as other features, advantages and benefits thereof over other packaging products and methods known in the art may be better understood with reference to the detailed description, which follows.

BRIEF DESCRIPTION OF THE DRAWINGS

So that the manner in which the features and advantages of the invention, as well as others which will become apparent, may be understood in more detail, more particular description of the invention briefly summarized above may be had by reference to the embodiment thereof which is illustrated in the appended drawings, which form a part of this specification. It is to be noted, however, that the drawings illustrate only various embodiments of the invention and are therefore not to be considered limiting of the invention's scope as it may admit to other effective embodiments as well.

DETAILED DESCRIPTION

Figure 1:
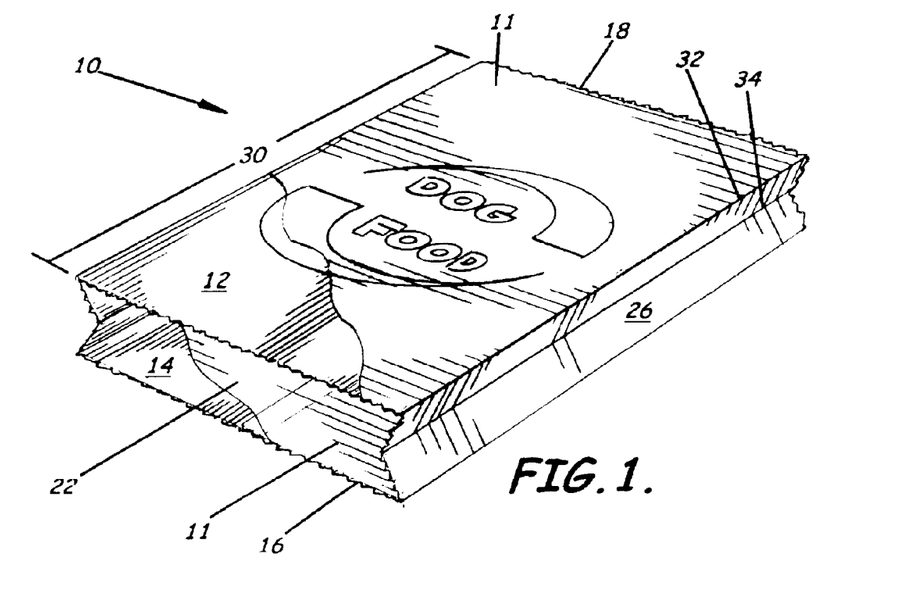
FIG. 1 is a perspective view of a sewn open mouth bag unassembled which was formed over a tube according to the present invention.

FIG. 1 illustrates a first exemplary embodiment of end product packaging taking the form of a bag 10 with an overprint varnish 11 on its outer substrate layer, or face 12, as shown in FIG. 1. Alternatively, the overprint varnish can be applied to the inner substrate layer, or back 14. As another alternative, the overprint varnish can be applied to both the face 12 and the back 14 of the bag 10. In order for the overprint varnish to be applied efficiently, a new method has been developed for applying an overprint varnish to the substrate that is used to form the end product packaging.

Figure 2:
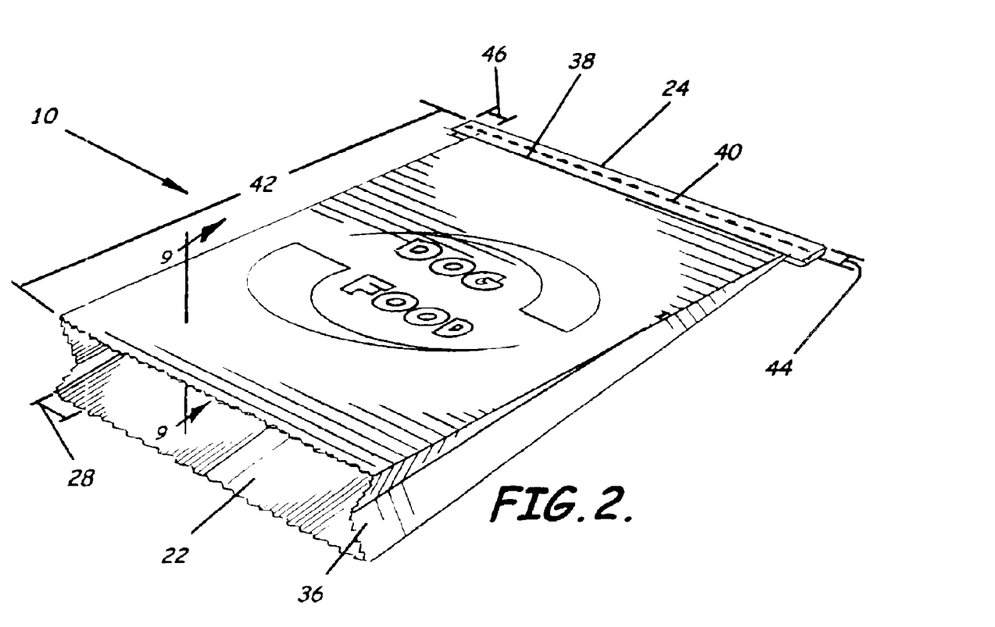
FIG. 2 is a perspective view of a finished sewn open mouth bag ready for filling with a product according to the present invention.

A bag 10 can be created by forming a tube from a paper substrate with one or both ends 16, 18, open, then closing one or both ends, 16, 18, as shown in FIG. 2, while leaving an opening through which the material to be transmitted into the bag 10. The tube is formed by binding the edges of the substrate to form a seam 20 (FIG. 1). The seam 20 can be formed using methods known in the art.

A finished sewn open mouth package 10 typically comprises a top opening 22 in which the customer fills the packaging with its own product, a closed bottom end 24 that is closed by sewing. The face 12 typically contains, any printing that is on the packaging. The packaging substrate is typically multi-ply with the ply containing the varnish coat on the outside ply. The package also has a gusset 26 that allows for folding of the package and the seam 20 where the package substrate is bonded together to form a bag. The seam 20 has an overlap 28 to reinforce the seam 20.

The length of the package is based upon the tube length 30 that is used to form the bag 10. The gusset 26 has an edge crease 32 that forms the border between the gusset 26 and the face 12. The gusset 26 also contains a center crease 34 that enables the bag to be folded. The portion of the bag that is used and tucked as the gusset is known as a gusset tuck 36. Sewing tape 38 is used at the bottom end 24 of the package 10 to provide closure of the bag, as shown in FIG. 2. The sewing tape 38 is sewn along a sewing line 40, which is typically located in the center of the sewing tape 38. The finished bag length 42 that extends from the top end 16 to the bottom of the sewing tape 38. The depth from the sewing line 40 to the bottom of the finished bag is known as a sewing depth, shown as 44 in FIG. 2. Many times the length of the sewing tape 38 is wider than the bag, leaving a tab that extends beyond the side of the bag. The tab is known as a tape extension 46 or ear.

The overprint varnish that is applied and forms part of the end product packaging 10 has a non-fluorocarbon, acrylate-based formulation. The composition of the overprint varnish is acrylate based. Suitable varnishes for this application method have been developed by Actinic, Inc. of 7210 Cessna Drive, Greensburo, N.C. 27409, and are the subject matter of currently pending U.S. patent application Ser. No. 09/798,180. In particular preferred embodiments, an overprint varnish identified commercially as MWX 0704 and available from Actinic can be used for the non-clay coated side applications, which are typically used for the inner or middle substrate layers. Overprint varnish MWX 0703, also available from Actinic, can be used for the clay-coated side applications, which are typically used for the outer substrate layers.

It is preferable for the substrate used to construct the packaging to be a bleached or unbleached natural kraft single or multi-ply paper. Multi-wall paper bags are typically made of three to six walls of heavy duty shipping sack kraft paper, usually of 40, 50, or 60 pound basis weight per wall. One, or more, may be a moisture barrier sheet. The best position in creating the packaging product is for the heaviest ply of any of the walls to be used on the inside of the packaging. Barriers are typically required to protect the product from outside agents, prevent the product from escaping the package, protecting the package from the product, and protecting people or equipment from the product.

Figure 7:
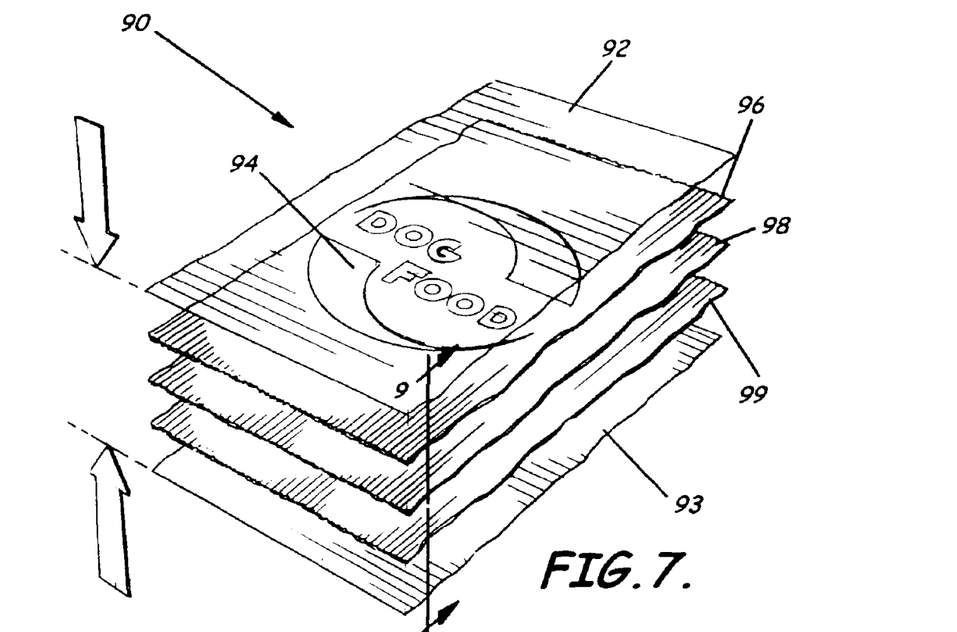
FIG. 7 is a perspective view of a three-ply substrate with graphics and overprint varnish applied to an outer surface of an outer ply and an inner surface of an inner ply according to the present invention.
Figure 9:
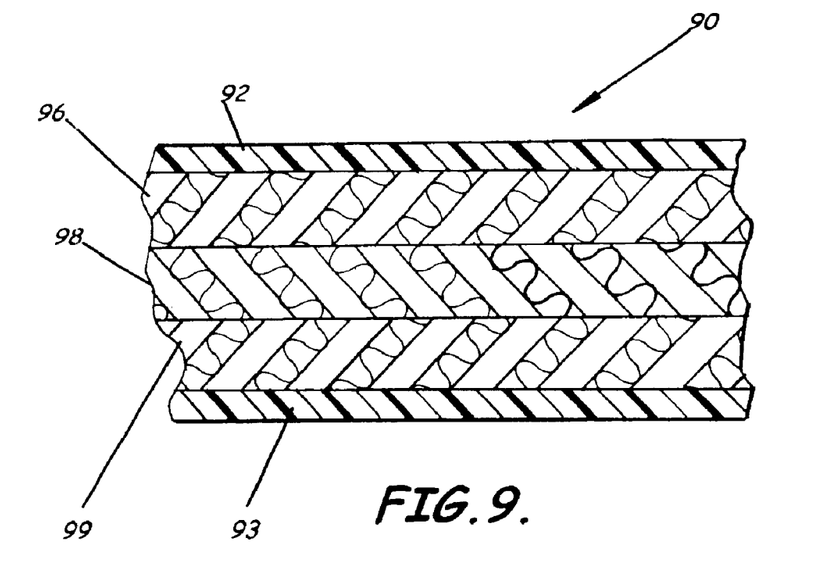
FIG. 9 is an enlarged fragmentary sectional view of a three-ply substrate with overprint varnish applied to an outer surface of an outer ply and an inner surface of an inner ply of the substrate taken along the line 9—9 of FIG. 7 according to the present invention.

The end product packaging of the present invention can be constructed using either a single ply substrate or a multi-ply substrate. The overprint varnish can be applied to one or both sides of each ply of a substrate. FIGS. 7 and 9 illustrate a three-ply substrate 90 used to construct the end product packaging. The inner ply 99 is shown with the overprint varnish 11 applied to an inner side of the substrate 90. Inner side refers to a side facing the product within the package. The middle ply 98 does not have the overprint varnish applied to it. The outer ply 96 has the overprint varnish 11 applied to an outer side of the outer ply 96. The three-ply substrate 90 can also have graphics 94 printed on the outer side of the outer ply 96 to help identify the contents within the finished product package. The graphics 94 are printed on the outer ply 96 first and allowed to dry before the overprint varnish 11 is applied over the graphics 94.

Figure 8:
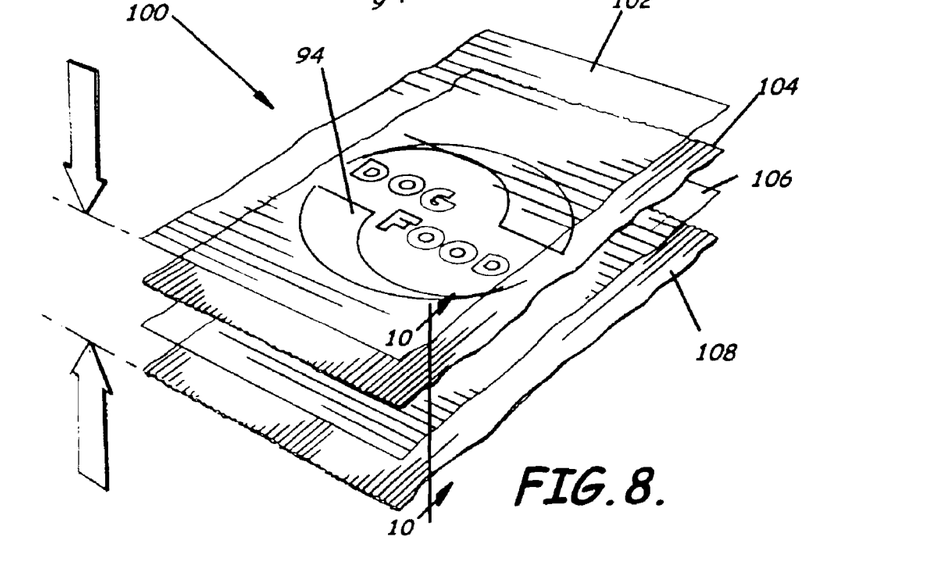
FIG. 8 is a perspective view of a two-ply substrate with graphics and overprint varnish applied to an outer surface of an outer ply and an outer surface of an inner ply according to the present invention.
Figure 10:
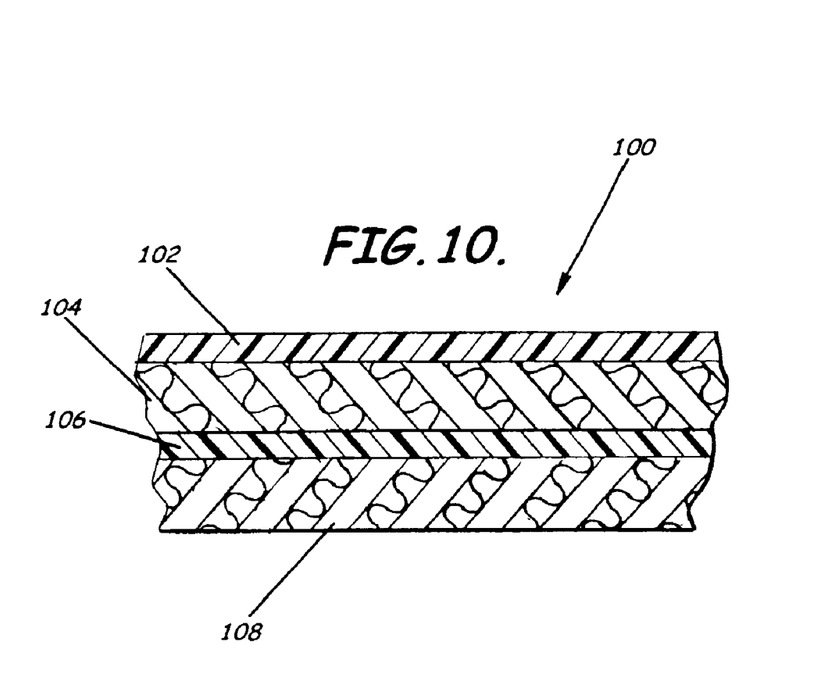
FIG. 10 is an enlarged fragmentary sectional view of a two-ply substrate with graphics and overprint varnish applied to an outer surface of an outer ply and an outer surface of an inner ply taken along the line 10—10 of FIG. 8 according to the present invention.

As another example of the numerous overprint varnish application configurations available, FIGS. 8 and 10 depict a two-ply substrate 100 constructed according to the present invention. The overprint varnish 102 is applied on an outer side of the outer ply 104. The overprint varnish 106 has also been applied to an inner side of the outer ply 104. The inner ply 108 does not have the overprint varnish applied to it in this example.

Most multi-wall bags are constructed with kraft paper. Kraft paper is a type of paper made entirely from wood pulp produced by a modified sulphate pulping process; the paper is coarse and noted for its strength; the name is obtained from the German word "kraft", meaning strength. There are various types of kraft paper that can be used for multi-wall bags, including, but not limited to, the following: brown, bleached, shipping sack kraft, converting kraft, wet strength kraft, regular extensible kraft, and free or Flakt dried extensible kraft papers.

The substrate in which the overprint varnish is applied to is preferably clay coated, which improves printing quality and appearance. The clay coating also helps provide an additional barrier to oil and grease. Paper substrates can also be pre-sized to increase the invention holdout. One example of a pre-sized, clay coated substrate is manufactured by Stora Enso of Finland with a regional office at 231—1st Avenue North, Wisconsin Rapids, Wis. 54495-8050. Enamels can also be used to coat the substrates. Use of off-white clay coated substrates should be avoided since these appear to be more yellow after curing the overprint varnish. Products often need to be protected from other environmental elements besides oil and grease. Many times the products need to be protected from moisture, light, oxygen, and other chemicals such as acids or alkalis. The surrounding environment may also need to be protected from the products within the packaging. Barriers can be used to keep odors in or out of packaging, as needed. Barriers also keep chemical products within the packaging bags. Uncoated or cast coated substrates should be avoided since they are so absorbent, which could interfere with curing the substrate once the overprint varnish has been applied.

Several criteria need to be evaluated when determining what type of barrier should be used in packaging bags. Some of these characteristics include the environment in which the product will be placed, the type of closures that are going to be used to prevent sifting of the product, water vapor resistance, solvent vapor resistance, odor containment, fat and oil and grease containment, and acid/alkali resistance.

Some of the common materials that are used as barriers in paper bags include polyethylene extrusion coated kraft, low density polyethylene film, high density polyethylene film, biaxially oriented polypropylene film, and various types of materials typically referred to as foil barriers. The acrylate based overprint varnish provides additional oil and grease resistant properties to the packaging, in addition to the oil and grease resistance that is already provided by the substrate paper.

Sometimes a product will require even more protection than is typically required for most products. In these cases, other special qualities are needed for the bags. These include that the bag be contamination free, that the coating or liner be releasable, insect resistant, and ink-rub resistant. Additionally, if the product is going to be exposed to sunlight for an extended time period, then specialty inks that are ultraviolet, chemical, and weather resistant can be used.

Many factors should be considered when determining what strength bag should be used. These include the distribution environment, resistance to external impacts, the closure strength, puncture and snag resistance, the reinforcement needs, weather resistance, and vibration or handling abuse. Applying an overprint varnish to the paper substrate will generally increase the strength of the bag.

The packaging with the overprint varnish possess great resistance to oil and grease, which makes the packaging ideal for many types of applications, such as packaging consumer goods like pet food. The openings and types of bottoms can be varied also, depending upon the use of the bags. Pet food bags typically use pinch bottom bags or sewn open mouth bags.

Pinch bottom bags are bags in which the stepping pattern of the various plies provides for more stiff resistance in the ends of the bag and allows the bag, when filled, to form a more box-like shape. Pinch bottom bags are a good choice where product protection and containment are important. In addition to pet food, pinch bottom bags are typically used for pesticides, herbicides, specialty fertilizers, plastic resins, chemicals, and pharmaceuticals.

Sewn open mouth bags are the oldest method of open mouth bagging. Sewn open mouth bags are factory sewn with thread and tape on the bottom end 24 and the top end 22, are sewn closed after the product has been placed within the bag 10. They are a good choice when a low cost bag is needed, product is free flowing, and the product does not require a high barrier level. Besides pet food, other uses for sewn open mouth bags include fertilizers and feed.

Many times bags are treated to add non-skid characteristics to them. With a varnish overcoat on clay coated bags, the resistance to skidding is controlled by additives or the chemicals used in the varnish. If needed, these skid resistant chemicals can be added to the overprint varnish to form the finished product packaging of this invention.

Figure 3:
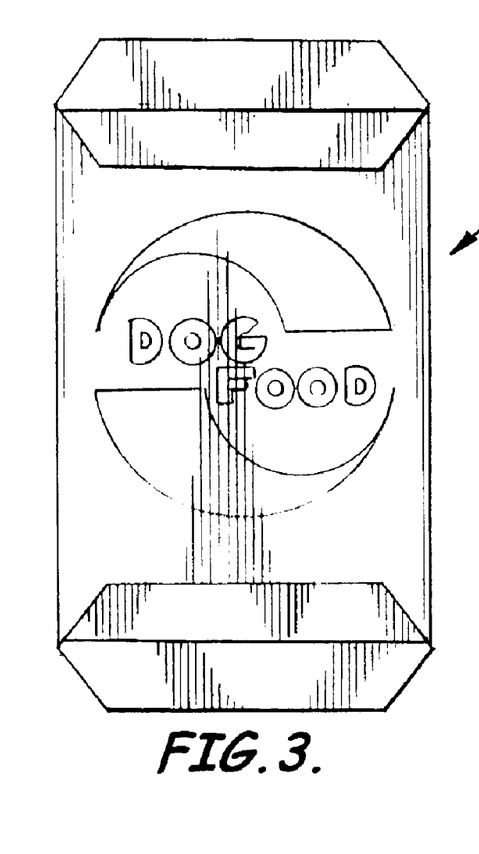
FIG. 3 is a front elevational view of packaging in the form of a pasted valve sack according to the present invention.
Figure 4:
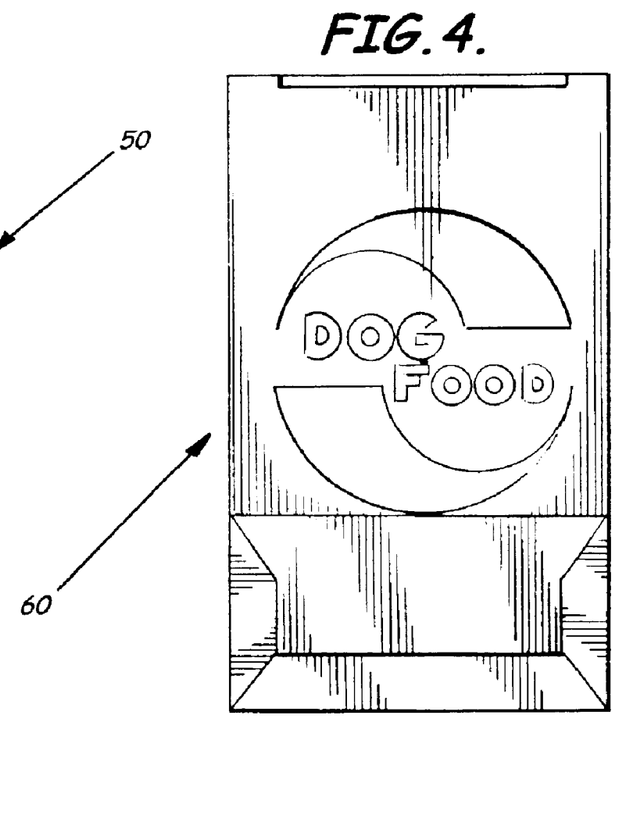
FIG. 4 is a front elevational view of packaging in the form of a pasted open mouth satchel bottom sack according to the present invention.
Figures 5, 6:
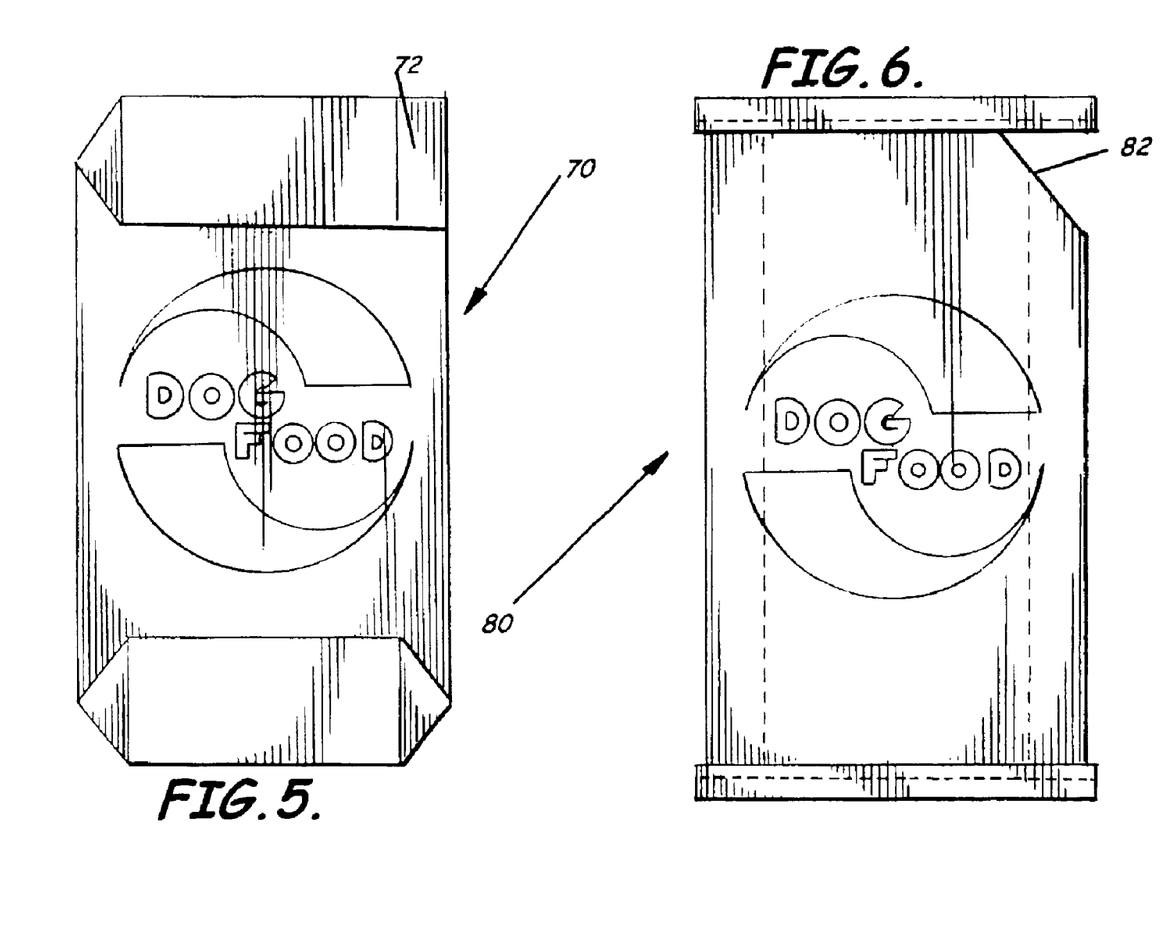
FIG. 5 is a front elevational view of packaging in the form of a pasted valve sack with a tuck-in sleeve according to the present invention.
FIG. 6 is a front elevational view of packaging in the form of a sewn valve gusseted sack according to the present invention.

The shape and features of the packaging constructed in accordance with the present invention can take many forms. Examples are shown in FIGS. 3 through 6. FIG. 3 depicts a pasted valve sack 50. A pasted valve sack is folded and pasted at each end and has a valve (not shown) inserted for filling. Perforations (not shown) are sometimes provided below the valve or all over the bag to enable better air escape with filling with product. FIG. 4 shows a pasted open mouth satchel bottom sack 60. This type of bag gives a filled sack a rectangular shape. The face width and gusset depth are typically sized based upon the pallet size on which the sacks will be placed. FIG. 5 depicts a pasted valve sack 70 that has a tuck-in sleeve 72. This type of bag is very similar to the sack in FIG. 4. The primary difference being that a tuck-in sleeve 72 is used and manually inserted into the sack to increase the sealability of the sack. FIG. 6 shows a sewn valve gusseted sack 80. The tube is sown at both ends with a sewn-in valve 82 that is incorporated into the corner for filling. These FIGS. demonstrate just a few of the many variations that can be made with packaging.

Figure 11:
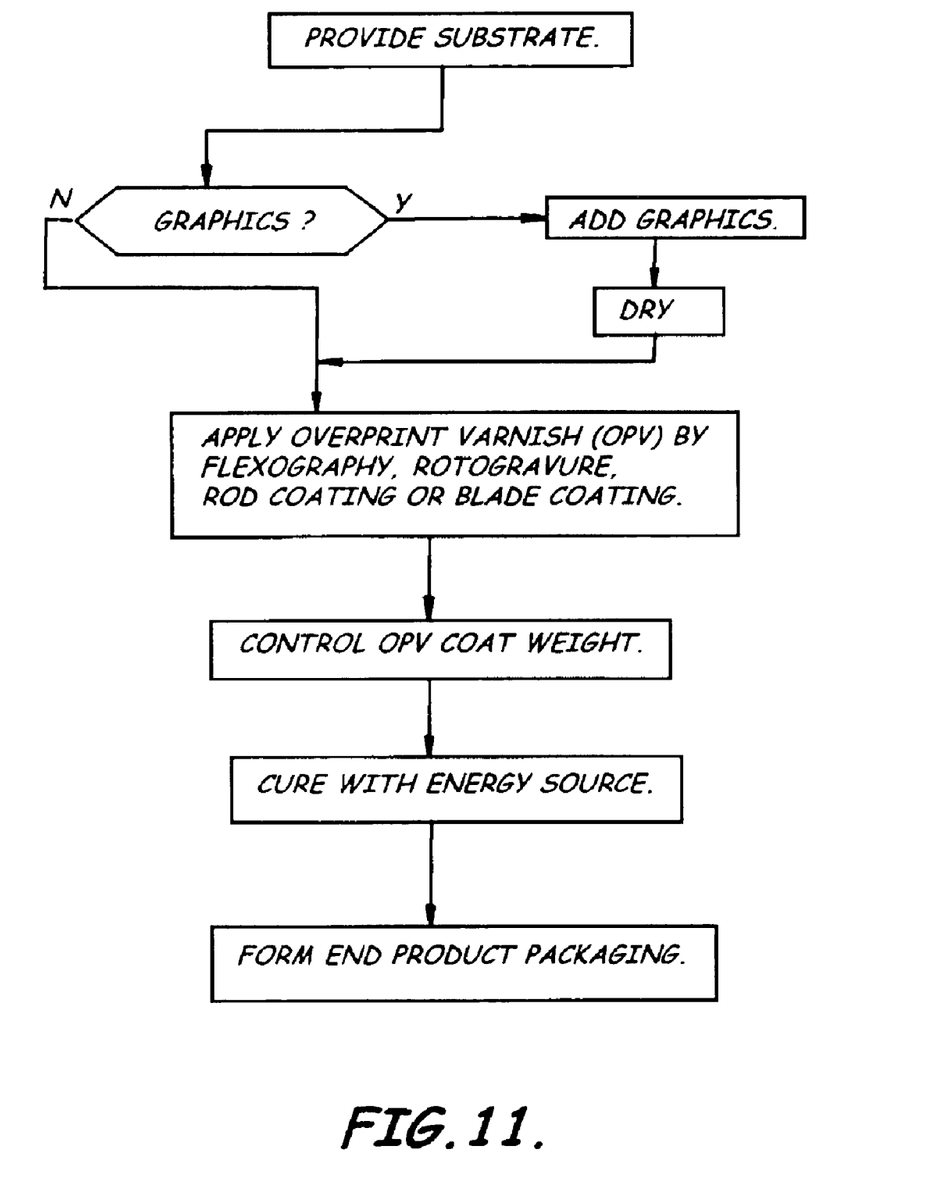
FIG. 11 is a flow diagram of a method of producing product packaging according to the present invention.

In addition to the packaging produced by using substrates with the overprint varnish applied to them, the present invention advantageously includes a method for applying and curing the overprint varnish to the substrate layers of the packaging. The present invention also advantageously provides a method for forming a product packaging using a substrate that has the overprint varnish applied to it. A simplified flow diagram of the method for forming the product packaging is included as FIG. 11.

In order to produce a bag with the overprint varnish on it, a new method of applying and curing the overprint varnish has been developed. The process begins by supplying a substrate that is going to be used for the product packaging. An example of a suitable substrate is one-side clay coated (CIS), natural kraft, multi-wall paper. Any suitable substrate can be used that will provide adequate protection and strength for the enclosed product. If any graphics are desired, they are applied and allowed to completely dry. The overprint varnish is then applied to an outer surface of the substrate face such as 12 in FIG. 1. The overprint varnish is then cured to a proper cure.

The varnish can be applied using alternative methods. The varnish is applied to at least one side of the substrate and then cured until a proper cure is reached. The other side is then coated and cured, just like the first side. As an alternative, the varnish can also be applied to both sides, the face 12 and back 14, and then cure both sides at the same time. In operation, the deciding factor is the configuration of the mechanical equipment used to apply the overprint varnish. The equipment has to be set up for one sided or two sided coating, depending upon which method is desired. Both methods are to be considered as within the scope of the present invention.

Figure 12:
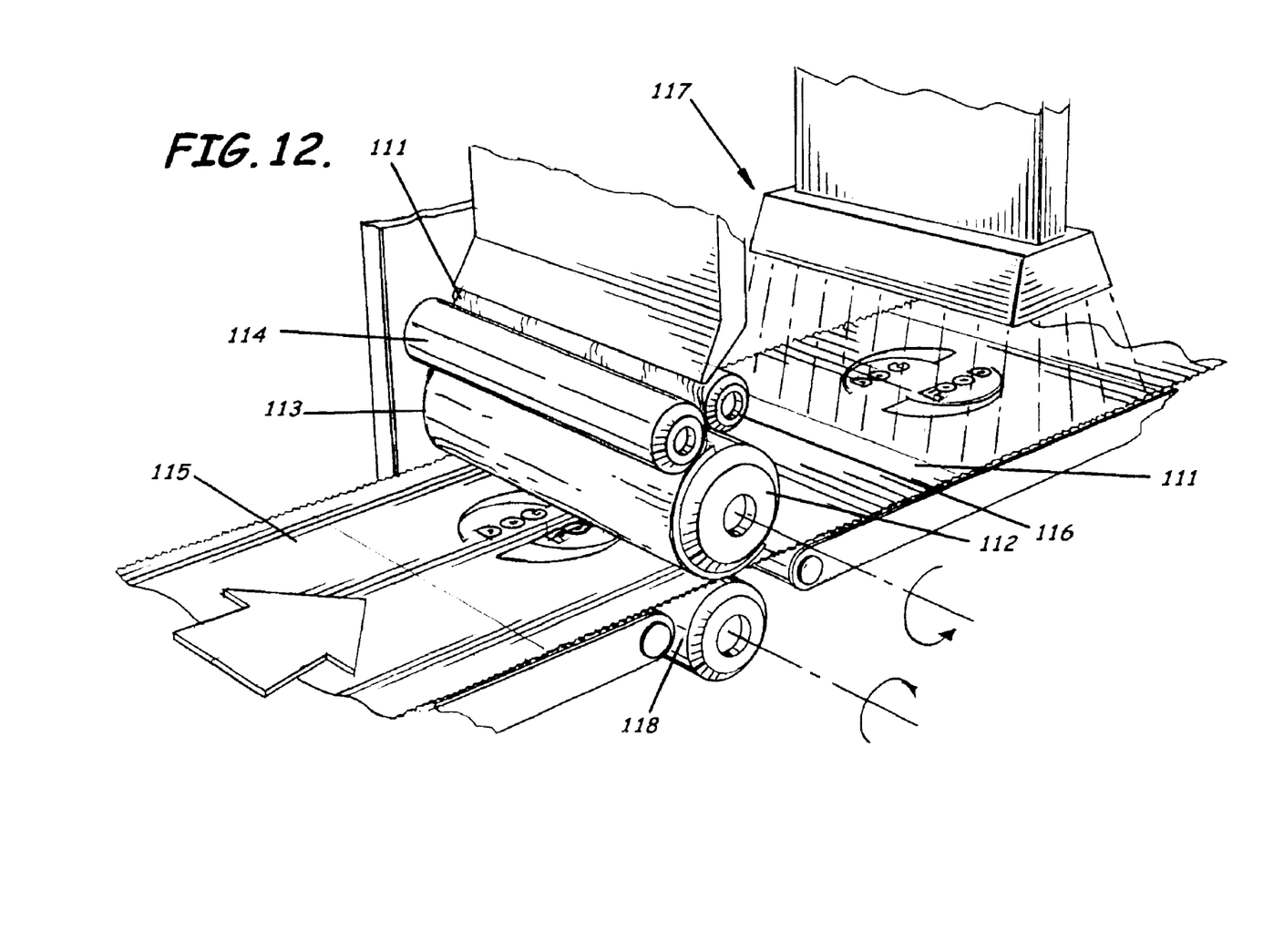
FIG. 12 is a schematic block diagram of an application by flexography and curing steps of an overprint varnish on a substrate according to the present invention.
Figure 13:
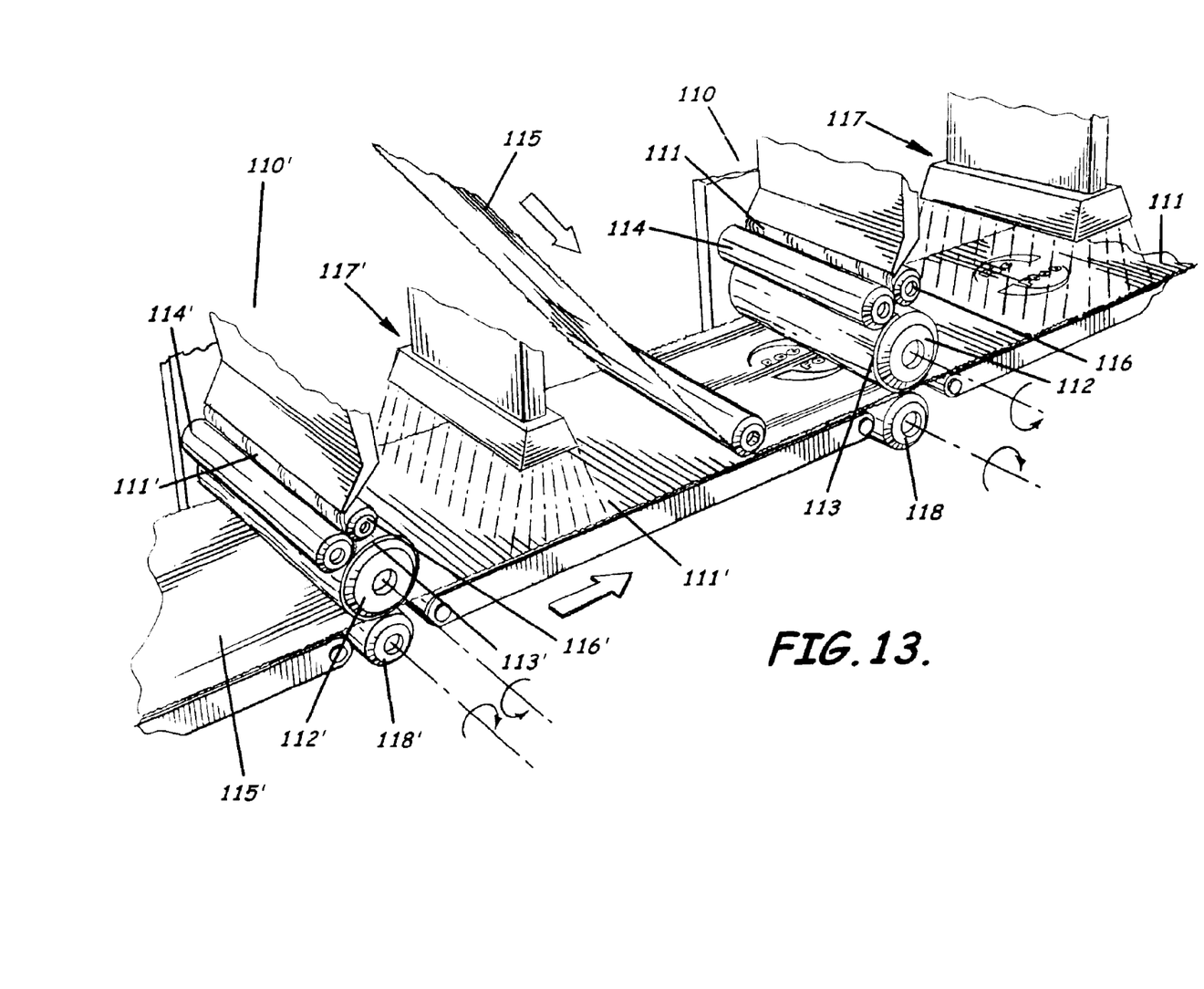
FIG. 13 is a schematic block diagram of an application by flexography and curing steps of an overprint varnish on a first substrate and a second substrate with graphics according to the present invention.

The application of the overprint varnish can be accomplished by several different methods. Such methods include, but are not limited to, flexography, rotogravure, rod coating, or blade coating. The preferred application method is flexography, which is illustrated in FIGS. 12 and 13. Flexographic printing uses a doctor roll, or rubber roll, 116 made of rubber, plastic, or some other flexible material. The overprint varnish is applied to a solid plate 113, which transfers the varnish 111 to the printed substrate 115. Flexography is the predominant method used for printing flexible bags, wrappers, and similar forms of packaging. The soft rubber rolls 116 are also well-suited to printing on thick, compressible surfaces such as cardboard packaging. Both sheet-fed presses and web presses are used in flexographic printing. Thus, standard printing equipment and technologies can be advantageously used to apply the overprint varnish.

Various factors, such as the viscosity of the overprint varnish, can attribute to the oil and grease resistance performance. For example, higher flexography or gravure applied viscosity will give greater varnish holdout on either application side. Greater holdout gives increased film thickness for a better physical grease barrier. The thick film must be flexible, however, in order to prevent pinholes and/or micro cracks when folded.

Once the overprint varnish 111 has been applied to the substrate 113, the varnish 111 must be cured. Curing the overprint varnish 111 regulates a cross-link density of the oligomer contained within the overprint varnish 111, as described herewithin. The preferred method of curing is by a combination of controlling a varnish coat weight and exposing the overprint varnish 111 to a curable energy source 117. Energy curing is preferably performed by passing the substrate 113 with the applied overprint varnish 111 under an ultraviolet light source 117 to effect curing to a dried state. Ultraviolet light is concentrated on the material 113 to be cured by a focused or flood beam polished reflector. Radiation curing is the preferred method of curing, but curing with other energy sources, such as X-rays and gamma rays, can be used.

Radiation curing is a low energy photochemical cross-linking reaction process that uses either intense short wavelength ultraviolet light or high energy electrons from an electron beam to turn liquid into solids virtually instantaneously. When UV light is used, the overprint varnish, which contains photoinitiators, reacts with the ultraviolet light to produce free radicals within the coating. The free radicals react with an oligomer, or a polymer containing two, three, or four monomers, to produce a photochemical cross-linked oligomer, which provides an oil and grease resistant coating. When an electron beam is used, the high energy level of the accelerated electrons directly cross-links the oligomer. The cross-link density of the oligomer is regulated through curing the overprint varnish with a curable energy source to ensure oil and grease resistant performance. The curable energy source can also be an X-ray or a gamma ray, in addition to the ultraviolet light and electron beam. The ultraviolet light, the X-ray, and the gamma ray are electromagnetic energy sources. For these electromagnetic energy sources, the curable energy source preferably has a wavelength of less than 400 nanometers.

Many factors contribute to the cure rate of overprint varnishes. Opacity is a factor since the material to be cured must see the energy source. Pigmentation is also a problem since it contributes to opacity and can limit the light that penetrates through the overprint varnish. Ultraviolet cure speed is directly related to the intensity of the ultraviolet light and the time of exposure. Inks can affect the cure rate of an ultraviolet overprint varnish in that some of the colors will reflect ultraviolet light upward into the coating, which increases the cure rate. Substrates can also affect the cure rate since any overprint varnish that is absorbed into the substrate will either cure very slowly or not at all, since it will not see ultraviolet light.

Curing continues until a "proper cure" is reached. The proper cure is based upon the varnish coat weight. The varnish coat weight will be controlled within the range of about 1.2 lb/3000 ft$^2$ to about 1.5 lb/3000 ft$^2$ for clay coated substrates and within the range of about 1.2 lb/3000 ft$^2$ to about 2.2 lb/3000 ft$^2$ for non-clay coated substrates. The varnish coat weight can be controlled by altering the applicator size for applying the overprint varnish to the substrate. By controlling the varnish coat weight, the process operates efficiently since only the energy necessary to cure to a specified set point is used. Additionally, the amount of overprint varnish applied to the substrate is optimized since only the amount needed is applied, which reduces the amount that is wasted. Once the overprint varnish has been applied and cured to a proper cure, then the end user product packaging is formed.

Various tests have been developed to determine the proper cure desired. Such tests include, but are not limited to, the felt tipped marker wipe, MEK rub, permanganate rub, infrared spectrophotometry, computerized cure analysis, abrasion rub, and slide angle to name a few. Other tests for determining the proper cure will be known to one skilled in the art.

The present invention has many advantages over product packaging created with oil and grease resistant coated substrates of the prior art. Such advantages include great oil and grease resistance, the overprint varnish protects visual graphic inks very well, and the overprint varnish also accepts packaging based adhesives very well. Another advantage is that the product packaging is more environmentally friendly than prior art packaging, especially since the packaging is biodegradable and provides no significant threat of toxicity to humans and mammals. The packaging is also recyclable and repulpable.

Other advantages exist for this new invention. One such advantage is that the new method of applying and curing the overprint varnish will allow manufacturers of packaging to purchase plain, untreated paper to make their packaging. They will be able to apply this overprint varnish with their existing printing machinery and then cure it with either an ultraviolet light or electron beam source. Since the energy curable activated overprint varnish possesses oil and grease resistant characteristics, the need to purchase expensive pre-coated substrates is eliminated, which is a tremendous cost savings to the packaging producers. There is also very little cost impact, if any, to the packaging producers since they currently have to apply an overprint varnish to their substrates and already having the equipment necessary to apply this overprint varnish.

The method of curing the overprint varnish on the substrate that forms the product packaging has many advantages over the prior art methods, such as drying in heaters or at room temperature. The energy curable curing process is very efficient since the substrate is cured to an optimum coat weight, thereby reducing the amount of energy that is expended in the process. This process also generally decreases the coating thickness of the substrate, when compared to prior methods, which is cost effective since it uses less overprint varnish and it enables the printing machinery to run better.

The methods of the present invention are also advantageous since the overprint varnish can be cured with a curable energy source at a preselected wavelength to change the qualities of the substrates to which the overprint varnish has been applied. The curable energy source can be an electromagnetic energy source, such as ultraviolet light. For example, curing with the energy source having a wavelength of less than 400 nanometers increases the oil and grease resistance properties of the substrate with the overprint varnish applied thereto. Other advantages include faster drying times and better graphics on the finished end product packaging.

From the foregoing it will be seen that the invention is well adapted to attain all of the ends and objects hereinabove set forth, together with other advantages that are obvious and that are inherent to the method and product.

It will be understood that certain features and sub-combinations are of utility and may be employed without reference to other features and sub-combinations. This is contemplated by and is within the scope of the claims.

Because many possible embodiments may be made of the invention without departing from the scope thereof, it is to be understood that all matter herein set forth or shown in the accompanying specification is to be interpreted as illustrative and not in a limiting sense. It should be apparent to those skilled in the art that the invention is susceptible to various changes without departing from the scope of the invention.

For example, various types of substrates with or without coatings can be used to apply the overprint varnish to and make the finished product package. Natural kraft paper can be used with or without being clay coated. Suitable substrates and coatings will be known to one skilled in the art. The use of the overprint varnish can be extended to virtually any type of packaging that needs oil and grease resistance. Such examples of consumer packaging end products that contain this overprint varnish include candy wrappers, food items, or any type of packaging that needs oil and grease resistant characteristics.

EXAMPLE 1

Substrate Properties

The table below demonstrates the influence on oil and grease barrier properties of three different uncoated substrates.
OGR=aggressive testing oil and grease resistant protocol, which is a method similar to TAPPI (Technical Association of the Pulp & Paper Industry) T507 cm-85 protocol and/or ASTM (American Society for Testing and Materials) F119-82, 1988.

% Failure=% underlayment grid that becomes stained after heating a saturated sand pile (5 grams) with simulated, penetrating grease on top of a double crossed folded substrate at 140° F. for 24 hours.

|  |  | Creased OGR % Failure | |
|---|---|---|---|
| Sample | Description | Clay Coated Side | Non-Clay Coated Side |
| A | 41# SAPPI Lusterprint | 42 | 100 |
| B | 46# StoraEnso Duraflex | 0 | 35–45 |
| C | Rhinelander Rhipel | 25 | 100 |

All three samples are typical non-fluorocarbon treated pet food bag substrates. Sample A is a bleached, clay coated, natural kraft, outer print ply. Sample B is a bleached, clay coated natural kraft substrate. Sample C is a highly refined, bleached, clay coated, natural kraft basestock.

EXAMPLE 2

Effect of Ultraviolet Overprint Varnish (OPV)

The table below describes the effect of the ultraviolet activated, overprint varnish on the grease resistance characteristics of the substrates.

|  |  | Creased OGR % Failure | |
|---|---|---|---|
| Sample | Description | Clay Coated Side | Non-Clay Coated Side |
| A | 41# SAPPI Lusterprint GRX | 1 | 0 |
| B | 41# SAPPI Lusterprint | 42 | 100 |
| C | Sample B + ultraviolet OPV | 13 | 65 |
| D | Sample A + ultraviolet OPV | 0 | 1 |

Samples A and D were fluorocarbon treated, which is the standard for the pet food industry. The difference between the non-fluorocarbon treated samples, B and C, demonstrates that the overprint varnish will offer some grease barrier, approximately 69% increase in grease resistance for an application to the clay coat side and a 35% increase for an application to the non-clay coat side. But the pet food industry oil and grease resistance performance standard is less than 5% for both clay and non-clay coated sides. Samples A and D demonstrate that the ultraviolet cured overprint varnish does not contribute to the oil and grease resistance of a fluorocarbon treated substrate.

EXAMPLE 3

Ultraviolet OPV Application

The substrate's non-clay coated side absorbs more of the overprint varnish than the clay coated side. Thus; the oil and grease barrier properties are application side dependent. The higher absorbing side will reduce the coating film thickness; thus, this will not only reduce the physical barrier but will also allow film pinhole formation from protruding surface fibers. Different overprint varnishes must be formulated for a particular application side.

| Sample | Substrate | % Failure, Creased OGR Ultraviolet OPV Application | | | |
|---|---|---|---|---|---|
| | | Uncoated | | Coated | |
| | | Non-Clay Coated | Clay Coated | Non-Clay Coated | Clay Coated |
| A | 41# SAPPI Lusterprint | 19 | 23 | 39.5 | 49.5 |
| B | 44# StoraEnso Duraflex | 100 | 25 | 19 | 4 |
| C | 46# StoraEnso Duraflex | 34.5 | 3 | 4 | 1 |

For ultraviolet overprint varnish treatment comparison, the uncoated and coated samples are described. Besides substrate sideness, substrate grade will also influence the final oil and grease resistance performance, Sample A vs. B and C. Two extra pounds of pre-coat to the Duraflex base stock dramatically improved the oil and grease resistance performance. Overprint varnish film thickness must overcome pinhole formation from fold cracking as illustrated by samples B and C clay coat side. The Duraflex sample B substrate clay coat was more susceptible to fold crack pinholes than the SAPPI grade, sample A. A high substrate presize treatment overcame the poor clay coat cracking surface as exemplified by C.

EXAMPLE 4

Turpentine Test

The turpentine test (TAPPI T 454 om-94) is the best method for measuring voids/holes in the physical barrier. It is another oil and grease resistance indicator. Penetration time in seconds is recorded. Low penetration time represents a poor barrier and the test is stopped after 30 min (1800 sec).

| Sample | Substrate | Failure time in sec, Creased Turpentine; ultraviolet OPV Application | | | |
|---|---|---|---|---|---|
| | | Uncoated | | Coated | |
| | | Non-Clay Coated | Clay Coated | Non-Clay Coated | Clay Coated |
| A | 41# SAPPI Lusterprint | 176 | 22.5 | 1567 | 16 |
| B | 44# StoraEnso Duraflex | 58 | 223 | 65 | 23 |
| C | 46# StoraEnso Duraflex | 663 | 1800+ | 1800+ | 1800+ |

Sample C exhibits no fold generated voids, micro cracks, and/or pinholes in the physical barrier.

EXAMPLE 5

Application Process Controls

The table below describes the effect of viscosity to oil and grease resistance performance. Higher flexography or gravure applied viscosity will give greater varnish holdout on either application side. Greater holdout gives increased film thickness for a better physical grease barrier. The substrate used was SAPPI Lusterprint.

| Sample | OPV Viscosity, cps @ 70° F. | % Failure Creased OGR; Clay-coated side |
|---|---|---|
| A | 90 | 53 |
| B | 250 | 12 |

The thick film must be flexible in order to not generate pinholes and/or micro cracks when folded.

EXAMPLE 6

Effect of Coat Weight to OGR Performance

The table below describes the effect of coat weight to oil and grease resistance performance.

| Sample | OPV lb/ream | % Failure Creased OGR; Non-Clay Coated Side |
|---|---|---|
| A | 0.78 | 100 |
| B | 1.30 | 93 |
| C | 2.23 | 16 |

The preferred curable OPV coat weight is 2.2 #/ream or greater.

The table below describes the cure parameters as measured in joules/inch on oil and grease resistance performance. Lacquer coat weight for both sides of the SAPPI Lusterprint substrate was 1.5 lb/ream.

| Sample | Joules/inch | % Failure Creased OGR | |
|---|---|---|---|
| | | Non-Clay Coated Side | Clay Coated Side |
| A | 280 | 37 | 20 |
| B | 220 | 34 | 19 |
| C | 175 | 30 | 2 |
| D | 140 | 17 | 2 |
| E | 125 | 16 | 0 |
| F | 105 | 15 | 0 |
| G | 92 | 12 | 0 |

The degree of cure is directly proportional to joules/in; i.e. higher joules/in will give greater degree of cure or polymer cross-linking or film inflexibility. Thus; lower "cure" is better and yields more fold resistant film. The non-clay coated and clay coated sides require different cure levels for maximum (towards 0% failure) OGR performance.

EXAMPLE 7

24 Hour Standing Oil Test

In this example, the substrates were bleached and clay coated on the outer, or print, ply only. A red oil was applied to either the clay coated side or on the non-clay coated side. The red oil mixture was at 140° F. and 50% relative humidity. The oil was allowed to remain on the sample for 24 hours. The results of the test are shown below. The higher percentage of stain bleedthrough indicates poor oil and grease barrier properties. Results were obtained from a non-folded and folded sample since crease resistance is required for the bag making operation.

|  | % Stain Area | | | |
| --- | --- | --- | --- | --- |
|  | Clay Coat Side | | Non-Clay Coat Side | |
| Sample | Flat | Crease | Flat | Crease |
| A | 0 | 0 | 0 | 1 |
| B | 0 | 10 | 0 | 56 |
| C | 0 | 15 | 0 | 3 |

Sample A is a substrate constructed with the industry fluorocarbon treatment standard. Sample B is the same substrate as Sample A, but Sample B has the overprint varnish applied in accordance with the present invention, instead of the industry fluorocarbon treatment standard. Sample C is a substrate from a different paper manufacturer with the overprint varnish applied in accordance with the present invention. Samples B and C are coated on both sides with the overprint varnish. As shown in the table, Sample C offered improved oil and grease barrier properties over the other two samples.

EXAMPLE 8

Four Week Storage

Finished product pet food bags were constructed in accordance with the present invention. The pet food bags consisted of an inner film ply that contained the overprint varnish, which served as the primary oil and grease barrier. Following the inner film ply, natural kraft plies were used for provide strength to the multi-wall bag. The outer bleached, clay coat print ply served as the secondary oil and grease barrier.

The finished multi-wall bags were packed with 20 pounds of high fat content (23%) dry cat food. The filled bags were stacked on a pallet in 8 layers with 5 filled bags per layer. The completed pallet was subjected to a transport simulator that represented being transported by a truck for 3000 highway miles. Following the transport simulation, the pallet was stored in an environmental chamber at 100° F. and 90% relative humidity for 4 weeks. The oil and grease stain resistance reduction by the outer print ply was reported as a percentage of visible stains on the outer print ply compared to those appearing on the natural kraft layer next to the outer print ply. A high percentage of non-visible outer ply staining indicates a better oil and grease resistant barrier.

|  |  | Amount of Staining (%) | | |
| --- | --- | --- | --- | --- |
|  | Fluorocarbon | Ply | | % Rate |
| Sample | Treatment? | Inner | Outer | Reduction |
| A | Yes | 26 | 0 | 100 |
| B | No | 24 | 20 | 17 |
| C | No | 18 | 13 | 28 |

The fiber fluorocarbon treatment appears to not show visible oil and grease stains. Fluorocarbon treatment does not however imply oil and grease resistant. The present invention offers a physical barrier to oil and grease penetration and is not intended to be a fiber treatment, which is used more for stain proofing the bags.

What is claimed is:

1. A method of curing an overprint varnish applied to a paper substrate so that the paper substrate having the cured overprint varnish applied thereto is oil and grease resistant, the method comprising the steps of:
   (a) supplying a paper substrate;
   (b) applying an overprint varnish to the paper substrate so that the overprint varnish overlies and abuttingly contacts the paper substrate; and
   (c) regulating a cross-link density of the overprint varnish and controlling a varnish coat weight within a range of about 1.2 lb/3000 ft2 to about 2.2 lb/3000 ft2 through curing the overprint varnish so that the overprint varnish provides increased oil and grease resistant properties to the paper substrate.

2. A method of claim 1 wherein the step of regulating the cross-link density of the overprint varnish includes curing the overprint varnish with a curable energy source selected from the group consisting of an ultraviolet light, an electron beam, an X-ray, and a gamma ray.

3. A method of claim 1, wherein the step of applying the overprint varnish includes utilizing an application technique selected from the group consisting a flexography, rotogravure, rod coating, and blade coating.

4. A method of claim 1, wherein the step of applying an overprint varnish to the paper substrate includes applying a non-fluorocarbon overprint varnish including a photoinitiator.

5. A method of claim 1, wherein the step of controlling the varnish coat weight includes altering an applicator size.

6. A method of claim 1, wherein the step of supplying the paper substrate includes supplying a paper substrate that is clay coated on at least one side and the step of applying the overprint varnish to the paper substrate includes applying the overprint varnish to substantially an entire surface area of the paper substrate.

7. A method of claim 6, wherein the step of curing the overprint varnish includes controlling a varnish coat weight within a range of about 1.2 lb/3000 ft2 to about 1.5 lb/3000 ft2.

8. A method of curing a non-fluorocarbon overprint varnish applied to a substrate so that the substrate having the cured non-fluorocarbon overprint varnish applied thereto is oil and grease resistant, the method comprising the steps of:
   (a) supplying a substrate;
   (b) applying indicia onto the substrate so that the substrate to be cured has indicia thereon;
   (c) applying a non-fluorocarbon overprint varnish comprising a photoinitiator to the substrate overlying the indicia so that the non-fluorocarbon overprint varnish overlies and abuttingly contacts the substrate prior to the step of curing; and
   (d) regulating a cross-link density of the overprint varnish through curing the overprint varnish so that the overprint varnish provides increased oil and ease resistant properties to the substrate.

9. A method of curing a non-fluorocarbon overprint varnish applied to a substrate so that the substrate having the cured non-fluorocarbon overprint varnish applied thereto is oil and grease resistant the method comprising the steps of:
   (a) supplying a substrate;
   (b) applying indicia onto the substrate so that the substrate to be cured has indicia thereon, the indicia being applied in first portions of the substrate and no indicia on second portions of the substrate, the first portions comprising a substantially smaller surface area than the second portions of the substrate;
   (c) applying a non-fluorocarbon overprint varnish comprising a photoinitiator to the substrate overlying indicia so that the non-fluorocarbon overprint varnish overlies and abuttingly contacts the substrate prior to the step of curing; and (d) regulating a cross-link density of the overprint varnish through curing the overprint varnish so that the overprint varnish provides increased oil and grease resistant properties to the substrate.

10. A method of claim 9, wherein the step of curing the overprint varnish includes controlling a varnish coat weight within a range of about 1.2 lb/3000 ft2 to about 2.2 lb/3000 ft2.

11. A method of claim 10, wherein the step of controlling the varnish coat weight includes altering an applicator size.

12. A method of claim 9, wherein the step of a lying a non-fluorocarbon overprint varnish includes applying the non-fluorocarbon overprint varnish so that the non-fluorocarbon substantially overlies both the first and second portions of the substrate.

13. A method of claim 12, wherein the step of curing the oil and grease resistant, overprint varnish includes controlling a varnish coat weight within a range of about 1.2 lb/3000 ft2 to about 1.5 lb/3000 ft2.

14. A method of forming a package with an overprint varnish having acrylate therein positioned on at least one paper substrate layer, the method comprising the steps of:

(a) supplying a paper substrate;

(b) applying the overprint varnish to at least one side of the paper substrate so that the overprint varnish overlies and abuttingly contacts the at least one side of the paper substrate;

(c) regulating a cross-link density of the overprint varnish to increase the oil and grease resistance of the paper substrate by curing the overprint varnish with an energy source having a preselected electromagnetic wavelength, the preselected electromagnetic wavelength being less than 400 nanometers; and (d) forming a package from the paper substrate.

15. A method of claim 14, wherein the step of regulating the cross-link density of the overprint varnish includes curing the overprint varnish with an energy source selected from the group consisting of an ultraviolet light, an electron beam, an X-ray, and a gamma ray.

16. A method of claim 14, wherein the step of applying the overprint varnish includes utilizing an application technique selected from the group consisting of flexography, rotogravure, rod coating, and blade coating.

17. A method of claim 14, wherein the step of curing the overprint varnish includes controlling a varnish coat weight within a range of about 1.2 lb/3000 ft2 to about 2.2 lb/3000 ft2.

18. A method of claim 14, wherein the step of supplying the paper substrate includes supplying a paper substrate that is clay coated on at least one side.

19. A method of claim 18, wherein the step of curing the overprint varnish includes controlling a varnish coat weight within a range of about 1.2 lb/3000 ft2 to about 1.5 lb/3000 ft2.

20. A method of claim 19, wherein the step of controlling the varnish coat weight includes altering an applicator size.

21. A method of forming a package with a non-fluorocarbon overprint varnish having acrylate therein positioned on at least one paper substrate layer, the method comprising the steps of:

(a) supplying a paper substrate having indicia theron;

(b) applying the non-fluorocarbon overprint varnish to at least one side of the paper substrate overlying the indicia so that the non-fluorocarbon overprint varnish overlies and abuttingly contacts the at least one side of the paper substrate;

(c) regulating a cross-link density of the non-fluorocarbon overprint varnish to increase the oil and grease resistance of the paper substrate by the non-fluorocarbon overprint varnish with an electron beam; and (d) forming a package from the paper substrate.

22. A method of regulating a cross-link density of a non-fluorocarbon overprint varnish comprising the steps of:

applying the non-fluorocarbon overprint varnish to a paper substrate; and curing the non-fluorocarbon overprint varnish applied to overlie and abuttingly contact the paper substrate so that the paper substrate having the cured non-fluorocarbon overprint varnish applied thereto is oil and grease resistant.

23. A method as defined in claim 22, wherein regulating the cross-link density of the non-fluorocarbon overprint varnish includes curing the non-fluorocarbon overprint varnish with a curable energy source selected from the group consisting of an ultraviolet light, an electron beam, an X-ray, and a gamma ray.

24. A method of curing a non-fluorocarbon overprint varnish applied to a substrate so that the substrate having the cured non-fluorocarbon overprint varnish applied thereto is oil and grease resistant, the method comprising the steps of:

(a) supplying a substrate;

(b) applying a non-fluorocarbon overprint varnish to substantially an entire surface area of the substrate so that the non-fluorocarbon overprint varnish overlies and abuttingly contacts the substrate, the non-fluorocarbon overprint varnish including a photoinitiator; and (c) regulating a cross-link density of the non-fluorocarbon overprint varnish and controlling a varnish coat weight within a range of about 1.2 lb/3000 ft2 to about 2.2 lb/3000 ft2 through curing the non-fluorocarbon overprint varnish so that the non-fluorocarbon overprint varnish provides increased oil and grease resistant properties to the substrate.

25. A method as defined in claim 24, wherein the step of supplying the substrate includes supplying a substrate that is clay coated on at least one side.

26. A method as defined in claim 24, wherein the substrate includes indicia thereon in first portions of the substrate and non indicia on second portions thereof, the first portions of the substrate comprising a substantially smaller surface area the second portions of the substrate.

27. A method as defined in claim 26, wherein the step of applying a non-fluorocarbon overprint varnish includes applying the non-fluorocarbon overprint varnish so that the non-fluorocarbon overprint varnish substantially overlies both the first and second portions of the substrate.

* * * * *